Feb. 9, 1965  M. PROCHÁZKA  3,168,825
RESONANT VIBRATION FATIGUE TESTING APPARATUS
Filed Nov. 24, 1961  2 Sheets-Sheet 1

INVENTOR.
Miroslav Procházka

Feb. 9, 1965   M. PROCHÁZKA   3,168,825
RESONANT VIBRATION FATIGUE TESTING APPARATUS
Filed Nov. 24, 1961   2 Sheets-Sheet 2

INVENTOR.
Miroslav Procházka
BY
Richard Low
Agt

United States Patent Office 3,168,825
Patented Feb. 9, 1965

3,168,825
RESONANT VIBRATION FATIGUE TESTING APPARATUS
Miroslav Procházka, Prague, Czechoslovakia, assignor to Statni vyzkumny ustav tepelne techniky, Prague, Czechoslovakia
Filed Nov. 24, 1961, Ser. No. 154,668
Claims priority, application Czechoslovakia, Feb. 15, 1961, PV 898/61
6 Claims. (Cl. 73—67.4)

This invention relates to fatigue testing apparatus, and more particularly to the type of apparatus in which resonant oscillations of a test specimen are induced by electromagnetically actuated vibrations of a flexure member to which a portion of the specimen is fixedly secured whereas the remainder of the specimen extends freely, or substantially freely from the fixed portion.

The fatigue testing of turbine blades and similar devices which are under oscillating fatigue stresses in normal service must be performed in such a manner that the test stresses are substantially identical with the service stresses. The distribution of masses and rigid elements in the tests must closely correspond to those to be encountered in service if the test results are to be meaningful. A fatigue testing apparatus meeting this requirement has been disclosed in United States Patent 2,299,424 to Orville S. Peters, and this invention is concerned with an improved apparatus having a wider range of application than the known device.

An important object of the invention is the provision of a fatigue testing apparatus which operates at higher efficiency than devices of this type heretofore available.

Another object is the provision of a fatigue testing apparatus capable of maintaining its high efficiency over a relatively wide range of testing frequencies.

An additional object is the provision of a fatigue testing apparatus of reduced bulk and weight without loss in durability, as compared to conventional apparatus of this type.

With these and other objects in view, the fatigue testing apparatus of the invention consists essentially of a base member, a flexure member, and magnetic means for oscillating a free end portion of the flexure member. A portion of the flexure member spaced from the free end portion is secured to the base member, and the oscillations of the free end portion of the flexure member take place in a plane which is spaced from the center of gravity of the base member.

This arrangement permits several advantageous features to be incorporated in the fatigue tester. The flexure member may be secured to the base member by a short connecting arm which is substantially rigid against torsion about an axis transverse of the plane of oscillation of the flexure member. The arm transmits the torsional stresses of the flexure member to the base member which may therefore assume the shape of a relatively thin plate having major dimensions of length and width transverse of the aforementioned axis of the connecting arm so that the major faces of the plates are approximately parallel to the plane of oscillation of the flexure member.

The flexure member is spaced from the face of the base plate in a direction transverse of the plane of oscillation, and electromagnets may be mounted on the base plate in a very simple manner on both sides of the flexure member in the plane of oscillation.

The flexure member may be fixedly fastened to the connecting arm, but it may also be mounted adjustably in the direction of its neutral axis, and the exciting electromagnets may be similarly adjustable on the base plate. The frequency of oscillation of the flexure member may thus be simply varied by changing its effective length. Variations of the width of the air gap between opposite electromagnets are readily accomplished by slidably or otherwise movably mounting the electromagnets on the base plate. This further contributes to efficient use of the testing apparatus at different frequencies.

The relatively light weight and small bulk of the base plate which replaces the heavy foundations of conventional fatigue testers permits the entire apparatus to be mounted on supports for rotation about a horizontally extending axis between several positions in which it may be fixed in a suitable manner. Such a pivotal mounting permits the determination of oscillation patterns on a test specimen by depositing a powdery material on an approximately horizontal face of the specimen. The distribution of the powder after a few oscillations gives an indication of oscillation nodes in a manner well known in itself. This test method is much more widely applicable in an apparatus which can be rotated about a horizontal axis and permits all surfaces of the specimen to be arranged for oscillation in a horizontal plane.

Other features of this invention and many of the attendant advantages thereof will be readily appreciated as the same becomes better understood by reference to the following detail description of preferred embodiments of the invention when considered in connection with the accompanying drawings in which like reference numerals designate like parts throughout the several figures thereof, and wherein.

Figure 1:
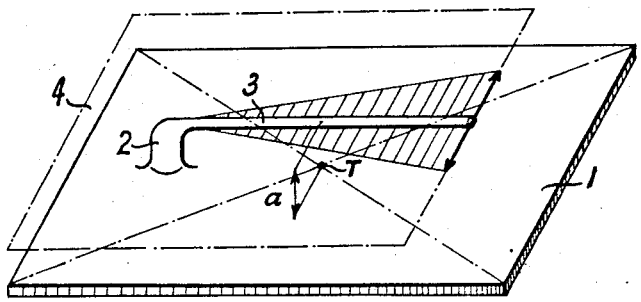
FIG. 1 is a perspective view of certain essential elements of an apparatus according to the invention.

Referring now to the drawings in detail, and initially to FIG. 1, there is shown a base plate 1 the length and width of which greatly exceed its thickness. A connecting arm 2 projects from a major face of the plate 1 in the direction of plate thickness. The projecting axial height of the arm 2 is approximately equal to its cross sectional dimensions so that the arm strongly resists torsional deformation by stresses tangential to its axis.

The projecting end of the arm 2 carries one end portion of an elongated flexure member 3 the free longitudinally terminal portion of which is to carry the test specimen in a known manner as will be described in more detail hereinafter. During test operations, the flexure member oscillates about the axis of the arm 3 in a plane 4 which is spaced from the center of gravity T of the base plate 1 by a distance $a$. This distance is greater than one half of the thickness of the plate 1, but it should be as small as is feasible in order to make the arm 2 short and rigid.

Figure 2:
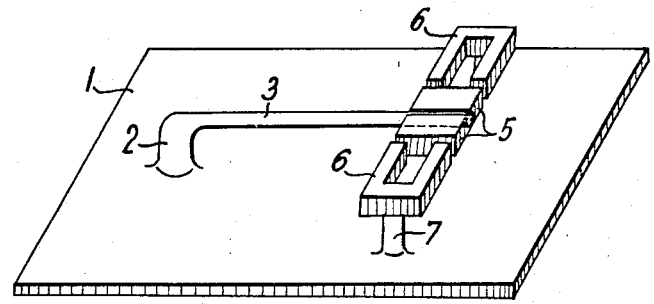
FIG. 2 shows the device of FIG. 1 in conjunction with the basic elements of its actuating mechanism.

The essential elements of the mechanism for inducing the oscillations of the flexure member 3 are shown in FIG. 2. The flexure member 3 which is of non-magnetic material, and is shown to be integral with the arm 2 carries two armatures 5 on its free end portion. The armatures are attracted by corresponding cores of electromagnets 6 mounted on the base plate 1 in the plane 4 on opposite sides of the flexure member 3 by means of brackets 7.

It is evident that the neutral axis of the mechanical system constituted by the flexure member 3 and the arm 2 is not located entirely within the plane of oscillation 4, but has a component which is perpendicular to that plane. Because of this arrangement, the member 3 is stressed almost exclusively in flexion and is subject to only minor shear stresses during operation of the apparatus. The stresses exerted on the arm 2 are predominantly torsional stresses with minor shear and flexural components.

Torsional deformation of the entire system of essential elements shown in FIG. 1 is substantially suppressed by the torsional rigidity of the arm 2. The torsional deformation of the connecting arm 2 is negligibly small as compared to the oscillating stroke of the free end of the flexure member 3. The connecting arm 2 is very short. Its deformation under the operating stresses of the apparatus is therefore insignificant, and the torsional moment is transmitted from the flexure member 3 to the base plate 1. The plate has its maximum rigidity in a plane transverse to the axis of the torsional stresses applied, and may therefore be made of small weight and bulk without being subject to undesirable transverse oscillations (buckling deformation).

Figure 3:
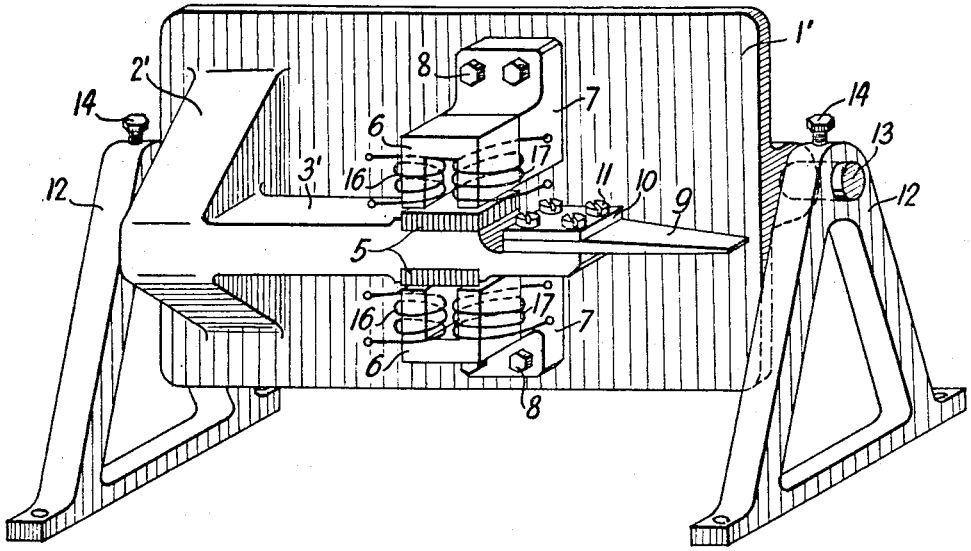
FIG. 3 is a perspective view of a first example of the fatigue testing apparatus of the invention embodying the elements illustrated in FIGS. 1 and 2.

The principles of structure and operation of the device partly shown in FIGS. 1 and 2 are embodied in the apparatus illustrated in FIG. 3. The base plate 1' of rectangular shape carries an integral connecting arm 2' of approximately triangularly prismatic shape. The broad base of the arm 2' is connected to the face of the plate 1'. The projecting narrow end of the arm 2' is integral with one of the longitudinal end portions of an elongated flexure member 3' of rectangular cross section.

A specimen 9 projects longitudinally from the free end of the member 3'. The specimen is fastened to the member 3' by means of a clamping plate 10 and bolts 11 in a manner known per se. The free end portion of the member 3' also carries two armatures 5 on opposite faces perpendicular to the plate 1'. Two electromagnets 6 respectively face the armatures 5. The magnets are mounted on brackets 7 which are fixedly fastened to the base plate 1' by means of bolts 8. The two poles of each magnet 6 carry respective windings 16, 17 which may be connected to a source of alternating current for actuating oscillation of the flexure member 3'. A direct current component is preferably superimposed on the alternating actuating current in order to maintain polarization of the magnets at all times and to prevent doubling of the oscillation frequency relative to the frequency of the exciting alternating current.

The base plate 1' together with the oscillating system supported thereon is mounted on two supports 12 by means of trunnions 13 which have a common horizontal axis. The angular position of the base plate 1' relative to the supports 12 may be secured by means of set screws 14 in any desired manner.

Figure 4:
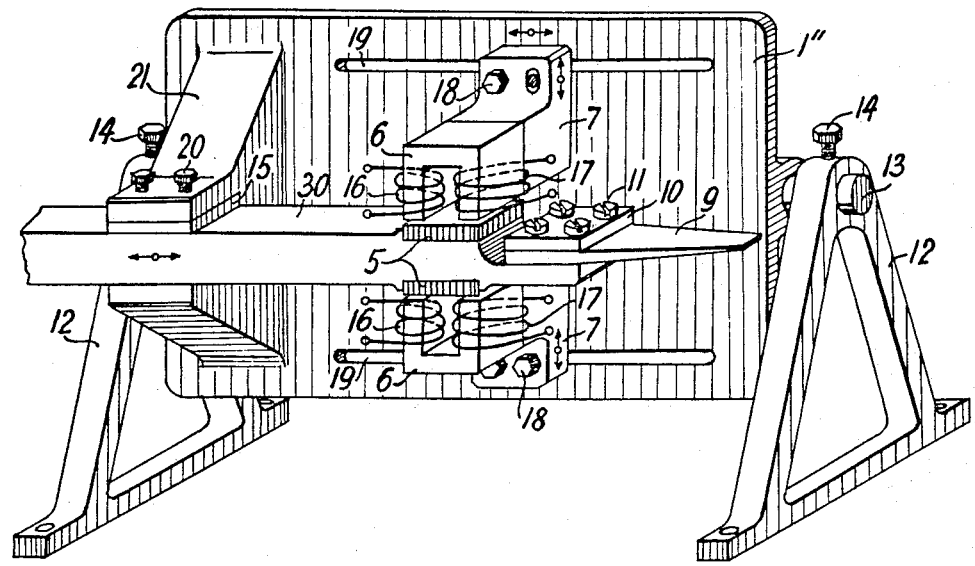
FIG. 4 shows another embodiment of this invention.

The modified embodiment of the invention illustrated in FIG. 4 differs from the apparatus of FIG. 3 by the provision of means for varying the spacing of the fixedly fastened portion of the flexure member from its free oscillating end portion. It is structurally and functionally closely similar to the apparatus shown in FIG. 3 in most other respects.

The base plate 1'' carries a connecting arm 21 of a shape similar to that of the arm 2'. The projecting narrow end of the arm 21 is notched slidably to receive a flexure member 30 of cross-sectionally rectangular, elongated shape. The member 30 is longitudinally slidable in the notch of the arm 21 and may be fixed in position by a pressure plate 15 which is urged against the member 30 in the notch by screws 20 threadedly mounted on the arm 21.

The free longitudinally terminal portion of the flexure member 30 carries a specimen 9 and two armatures 5 in the same manner as described hereinabove in connection with the first embodiment of the invention illustrated in FIG. 3. The armatures 5 cooperate with respective magnets 6 each mounted on a bracket 7.

The base plate 1'' has two elongated slots 19 parallel to the member 30. The slots are respectively engaged by the bolts 18 which fasten the brackets 7 to the base plate 1'', and thus permit the magnets to be adjusted longitudinally of the flexure member 30 when the effective length of the latter is varied by movement in the notch of the connecting arm 21, and to keep the magnets aligned with their respective armatures.

The openings in the brackets 7 through which the bolts 18 pass are elongated in a direction transverse of the slots 19 and parallel to the plane of oscillation of the member 30. The air gap between the two electromagnets 6 may thus be varied by simply loosening the bolts 18 and shifting the brackets 7 on their bolts 18. The simple means provided for adjusting the effective length of the flexure member 30 and for changing the position of the magnets 6 substantially increase the useful range of oscillating frequencies of the apparatus.

It is evident that the spacing of the plane of oscillation of the flexure member in the fatigue testing apparatus of the invention from the center of gravity of the base plate makes it possible to reduce the size and weight of the apparatus, and particularly that of the supporting foundation structurre while achieving a substantial gain in operating convenience and range of application. The plate shaped base member is stressed substantially exclusively in the direction of its major dimensions and is thus immune against transverse oscillations which would tend to buckle it. Electromagnetic actuating means for exciting oscillations of the flexure member may be arranged on opposite sides of the flexure member in a very simple manner. The provision of electromagnets on opposite sides of the flexure member doubles the exciting effect on the vibrating flexure member.

The adjustable air gap between the electromagnets is essential for operation of the apparatus at maximum efficiency over a very wide range of frequencies. This adjustment can be made particularly simple in an apparatus in which the flexure member oscillates in a plane parallel to the top face of the base plate.

The variation of the effective length of the flexure member can be achieved in a simple and effective manner for the same reasons which account for the simplicity of adjustment for the magnet air gap.

The overall dimensions and the weight of the apparatus can be held so low that it may be rotatably mounted on relatively light supports for the determination of oscillation patterns on all surfaces of a test specimen by the powder method.

It should be understood, of course, that the foregoing disclosure relates to only preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A resonant vibration fatigue testing apparatus, comprising
   (a) a plate member having a center of gravity, the thickness of said plate member being substantially smaller than the major dimensions of length and width thereof;
   (b) connecting arm means projecting from said plate member in the direction of said thickness of the latter, said arm means being substantially rigid against torsion about an axis parallel to said thickness;
   (c) an elongated flexure member having one lognitudinally terminal portion secured to said arm means and a free longitudinally terminal portion spaced from said one portion in the direction of one of said major dimensions;
   (d) magnetic means for oscillating said free terminal portion in a plane spaced from said center of gravity in the direction of said thickness and substantially parallel to said major dimensions of said plate member; and (e) means for mounting a specimen on said free terminal portion.

2. An apparatus as set forth in claim 1, wherein said magnetic means include two electromagnets respectively spaced from said free terminal portion of said flexure member in said plane in opposite directions transverse to the direction of elongation of said flexure member.

3. An apparatus as set forth in claim 2, wherein said electromagnets are mounted on said plate member and movable thereon in said respective opposite directions toward and away from said free terminal portion.

4. An apparatus as set forth in claim 1, further comprising means for longitudinally moving said flexure member on said connecting arm means, whereby the spacing between said arm means and said free terminal portion may be varied.

5. An apparatus as set forth in claim 1, further comprising a support, said plate member being rotatable on said support about an axis extending horizontally and in the direction of at least one of said major dimensions.

6. An apparatus as set forth in claim 5, further comprising means for selectively securing said plate member on said support against rotation about said horizontally extending axis.

References Cited by the Examiner
UNITED STATES PATENTS

| | | | |
|---|---|---|---|
| 2,299,424 | 10/42 | Peters | 73—67.4 |
| 2,450,939 | 10/48 | Cor | 73—67.4 |
| 2,500,764 | 3/50 | MacGeorge | 73—67.4 |

RICHARD C. QUEISSER, *Primary Examiner*.